United States Patent [19]

Smith

[11] 4,075,107
[45] Feb. 21, 1978

[54] NOVEL FILTER AND METHOD OF MAKING SAME

[75] Inventor: Floyd S. Smith, Kalamazoo, Mich.

[73] Assignee: Brown Company, Kalamazoo, Mich.

[21] Appl. No.: 705,066

[22] Filed: July 14, 1976

[51] Int. Cl.$^2$ .................. B01D 27/06; B01D 29/06
[52] U.S. Cl. .................. 210/493 R; 93/1 D;
99/306; 210/508; 428/153
[58] Field of Search .................. 210/464–469,
210/473–481, 483, 486, 487, 493 R, 494;
99/295, 306; 93/1 D, 60, 86; 264/163, 82;
426/433, 77–84; 428/35, 153

[56] References Cited

U.S. PATENT DOCUMENTS

| 733,728 | 7/1903 | Mauser | 93/60 |
|---|---|---|---|
| 2,131,438 | 9/1938 | Jensen | 93/60 |
| 2,210,114 | 8/1940 | Doble | 93/60 |
| 2,234,397 | 3/1941 | Bentz | 99/306 |
| 3,374,897 | 3/1968 | Martin | 99/306 |
| 3,490,356 | 1/1970 | Peterson et al. | 99/295 |
| 3,512,458 | 5/1970 | Eme | 93/1 D |
| 3,550,421 | 12/1970 | Stakel | 93/60 |
| 3,597,222 | 8/1971 | Kalemba | 99/295 |

FOREIGN PATENT DOCUMENTS

| 2,235,214 | 7/1972 | Germany | 99/295 |

*Primary Examiner*—Frank W. Lutter
*Assistant Examiner*—Frank Sever
*Attorney, Agent, or Firm*—Gordon W. Hueschen

[57] ABSTRACT

The invention relates to filter cups adapted for use in Melitta style coffee makers made of a unitary sheet of filter paper having integral fluted sides flaring outwardly from a stationary bottom and to a method and apparatus for making the same. The apparatus comprises complementary die members adapted to cut and flute the filter discs having central apertures, one of which is affixed to a heating and drying tube having the same diameter as the aperture. A plunger having a stretching head is passed through the other aperture to push the cut and formed filter discs into the heating and drying tube and at the same time to stretch the central portion to form a dish-shaped bottom having integral fluted sides flaring outwardly therefrom.

7 Claims, 10 Drawing Figures

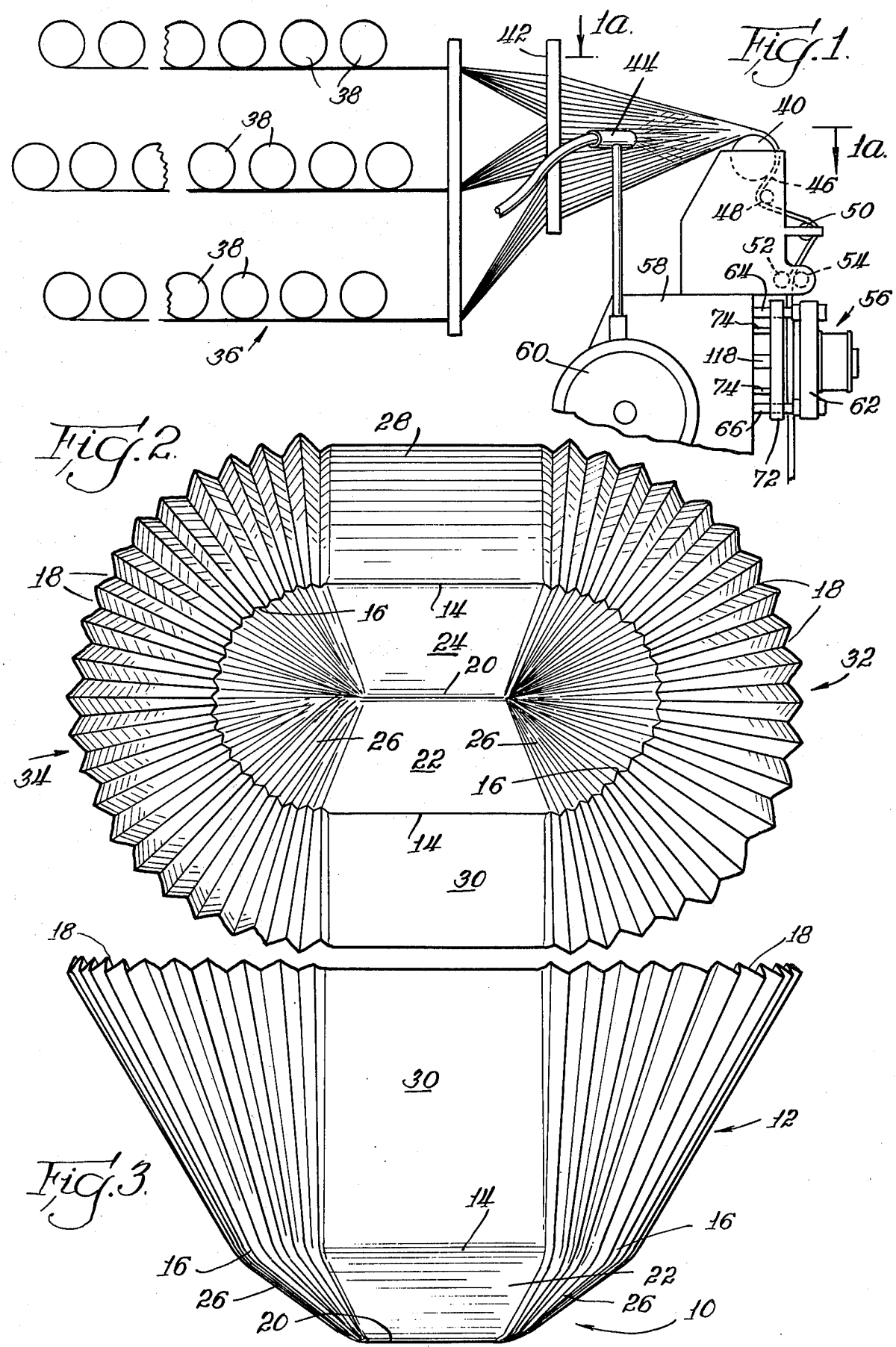

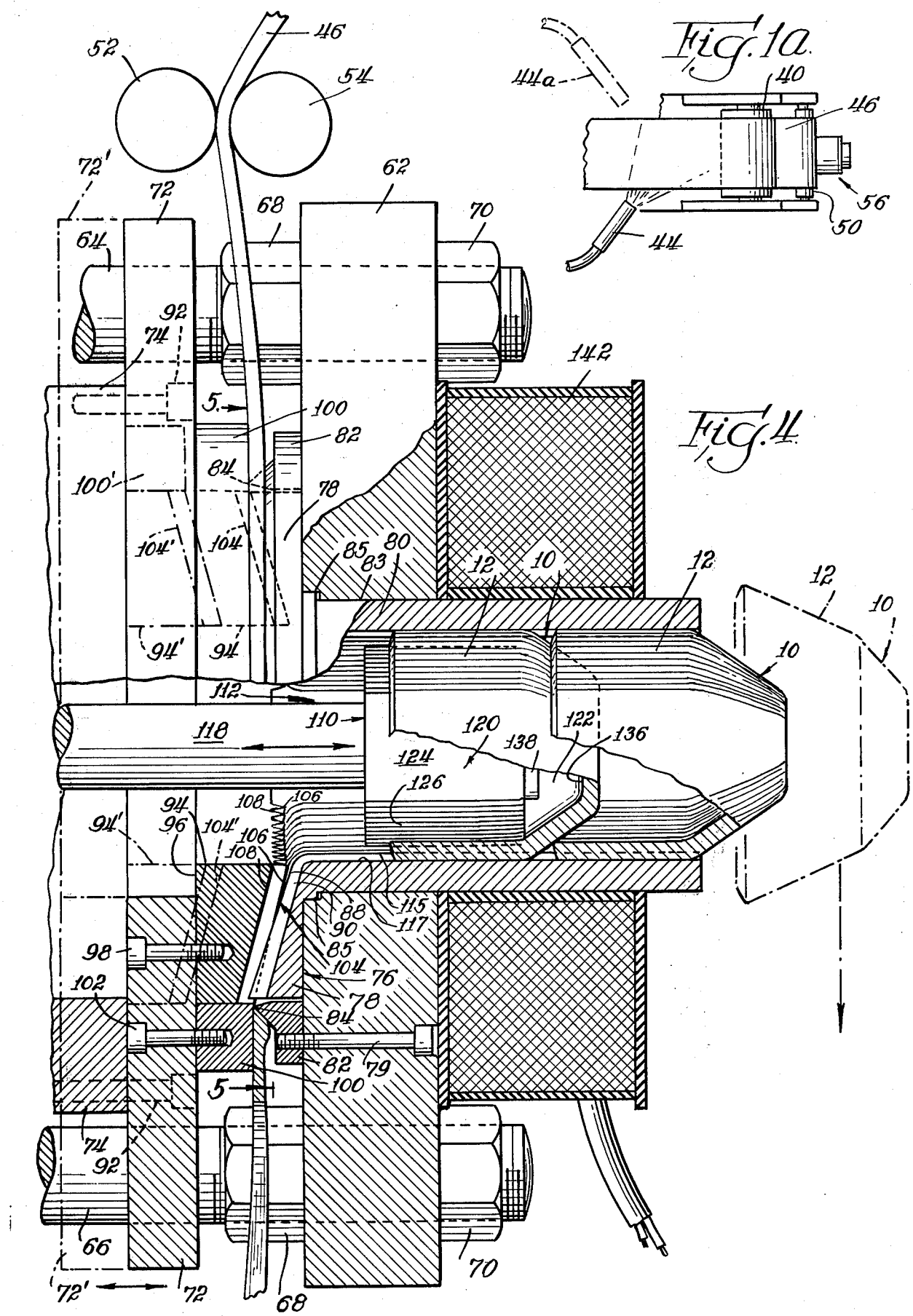

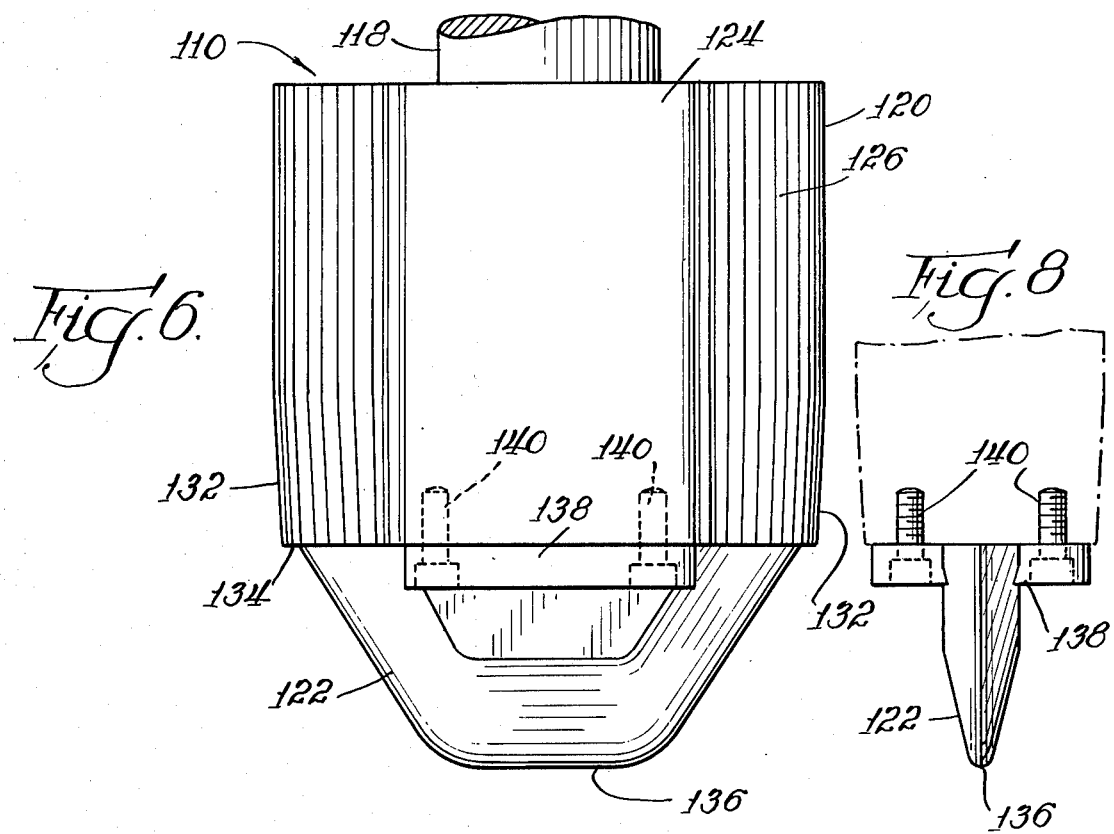
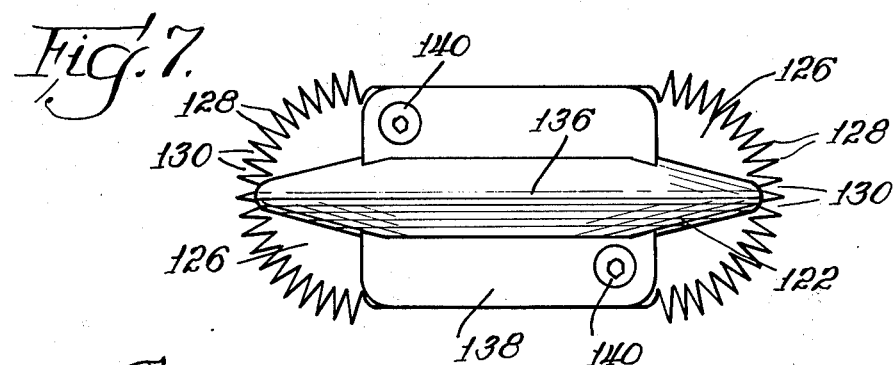
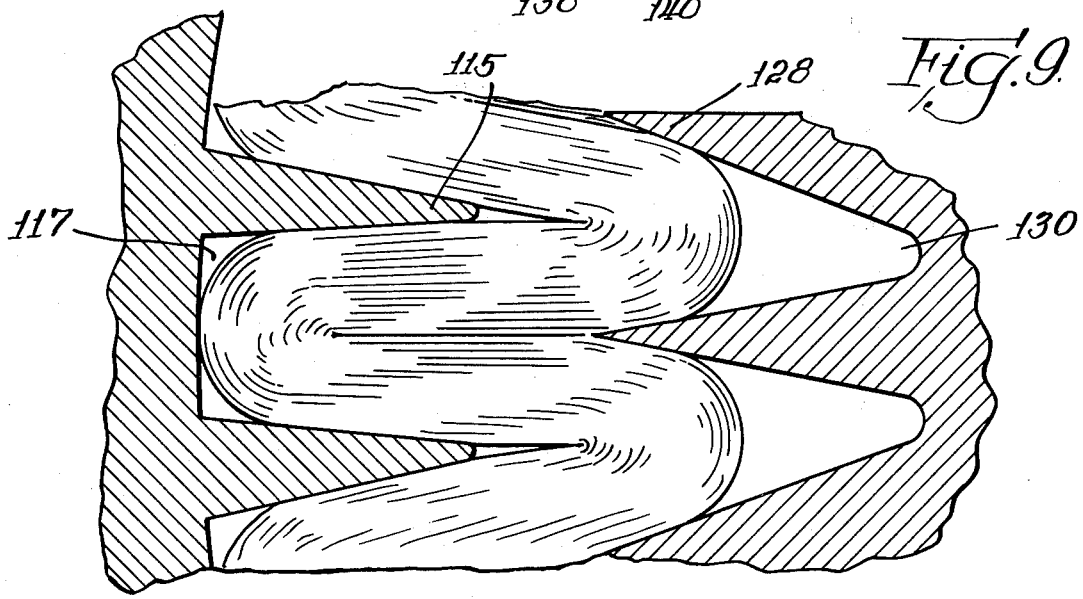

NOVEL FILTER AND METHOD OF MAKING SAME

BACKGROUND OF THE INVENTION

Field of Invention

This invention relates to filter cups adapted for use in coffee makers of the Melitta type, which includes Braun, Schick, Eva, West Bend, and Rockline types, and to a method and apparatus for making the same.

PRIOR ART

Coffee makers of the Mr. Coffee type employ filter cups having fluted sides and a flat bottom. In such coffee makers, however, the ground coffee is dispersed over a relatively large, flat bottom so that it is a major problem to get uniform distribution of the water passing through the ground coffee.

In the Melitta type coffee makers, this disadvantage is avoided by means of an oval conical filter having a narrow bottom. Such filters are made from a single sheet of filter paper folded on itself and cut to provide a flat bottom, upwardly and outwardly extending side edges, and an arcuate top connecting the tops of the two side edges. One of the side edges is formed by the crease formed by folding the sheet on itself and the other side edge and the bottom are crimped together to form a seam. Thus, when the filter cup is opened up, it forms an oval conical filter having a narrow bottom, but one which has an outwardly projecting seam along the bottom edge and along one side edge. This seam folds back on the filter cup in use and thus reduces the effective filter area. Moreover, this filter lacks mirror image symmetry about its transverse axis, is not seamless, and does not have a dish-shaped bottom.

OBJECT OF THE INVENTION

It is an object of the invention to provide new and improved filter cups adapted for use in Melitta type coffee makers. It is a further object of the invention to provide such cups from a single unitary, unseamed sheet of filter paper.

Further objects of the invention are to avoid the disadvantages of the prior art and to obtain such other advantages as will appear as the description proceeds.

SUMMARY OF THE INVENTION

The invention relates to a seamless filter cup for use in filter coffee makers of the Melitta type which filter cups comprise a unitary sheet of filter paper having integral fluted sides flaring outwardly from a dish-shaped bottom in mirror image symmetry about its longitudinal, transverse, and perpendicular axes and which advantageously has parallel sides and arcuate ends. Advantageously, the portions of the sides flaring outwardly from the arcuate ends are fluted and the sides flaring outwardly from the parallel sides are planar. Advantageously, the dish-shaped bottom has side portions which converge from the parallel edges thereof to a center line which is shorter than the parallel side edges and parallel thereto and has flutes radiating from the ends of the said center line to the arcuate edges of the dish-shaped bottom. Advantageously, the filter paper cups are made of cellulose fiber from chemically prepared wood which is uncalendered, unsized, is creped about 6 percent to about 15 percent, has a moisture content between about 3 and about 6, and has about 28 pound to about 40 pound basis weight.

Filter cups as described are prepared by means of apparatus which comprises means for assembling a plurality of sheets of filter paper into a composite web, means for steaming said web with moist steam, means for cutting discs from said web and forming flutes in the side portions thereof surrounding said bottom portion, means for holding said side portions to a position essentially normal to said bottom portion while maintaining the flutes therein, means for stretching the bottom portion, and means for heating and drying the cut and formed discs while the side portions are thus folded and the bottom portion is thus stretched to set the filter cups in the desired fluted and dish-shaped conformation. Advantageously, the means for cutting and forming the filter discs comprise complementary die members having a cutting ring and complementary flute-forming lands and grooves extending radially from central apertures having essentially the shape of the bottom portion of the filter cup. Advantageously, one of these die members is convex and the other concave. Preferably, the die members have arcuate end portions which have flute-forming lands and grooves and side portions which do not.

Advantageously, the central aperture of the concave die is associated with a tubular element forming an axial extension thereof with longitudinal grooves in the walls thereof forming extensions of the grooves in the concave die member. The means for folding the side portions of the cut filter discs and stretching the bottom portion thereof advantageously comprises a plunger or ram adapted to reciprocate through the apertures in said dies to engage the cut filter discs therein and push them into the tubular element, the said plunger having a nose thereon shaped to engage the bottom portion of the filter discs in the die member along a transverse center line thereby to stretch the central portion of the filter discs corresponding to the apertures in the die members into the desired dish-shaped bottom. After the filter discs are thus pushed into the tubular element, or simultaneously therewith, the heat is applied to said tubular element to effect heating and drying of the folded and stretched filter discs therein. Advantageously, the plunger or ram has grooves and lands thereon complementary with the grooves and lands in the tubular element but spaced therefrom the thickness of the assembled paper web. By adjusting the number of sheets of filter paper in the web, the drag on the filter discs being pushed into the element may be increased or decreased as desirable or necessary to correlate the same with the stretching of the central portion of the filter discs.

In operation of the apparatus, a plurality of unitary sheets of filter paper are assembled into a composite web, the web is steamed with moist steam, discs are cut from the web, and flutes formed into the side portions thereof surrounding a bottom portion. The side portions are folded to a position esentially normal to the bottom portion and the bottom portion is stretched dish shape. While maintaining the flutes therein, the cups in this nested position are heated and dried to set them in the desired fluted and dish-shaped conformation.

BRIEF DESCRIPTION OF THE DRAWINGS

In the Drawings

FIG. 1 is a side elevation of the apparatus according to the invention.

FIG. 1a is a detailed view of FIG. 1.
FIG. 2 is a plan view of a filter cup of the invention.
FIG. 3 is a side elevation of the filter cup.
FIG. 4 is a detailed view of FIG. 1.
FIG. 6 is a side elevation of the plunger of FIG. 4.
FIG. 7 is an end view of FIG. 6.
FIG. 8 is an end view of the nose portion of FIG. 6.
FIG. 9 is a detailed view showing the ram and the folded filter cups in the tubular extension of the female die.

DETAILED DESCRIPTION OF THE INVENTION

Figure 5:
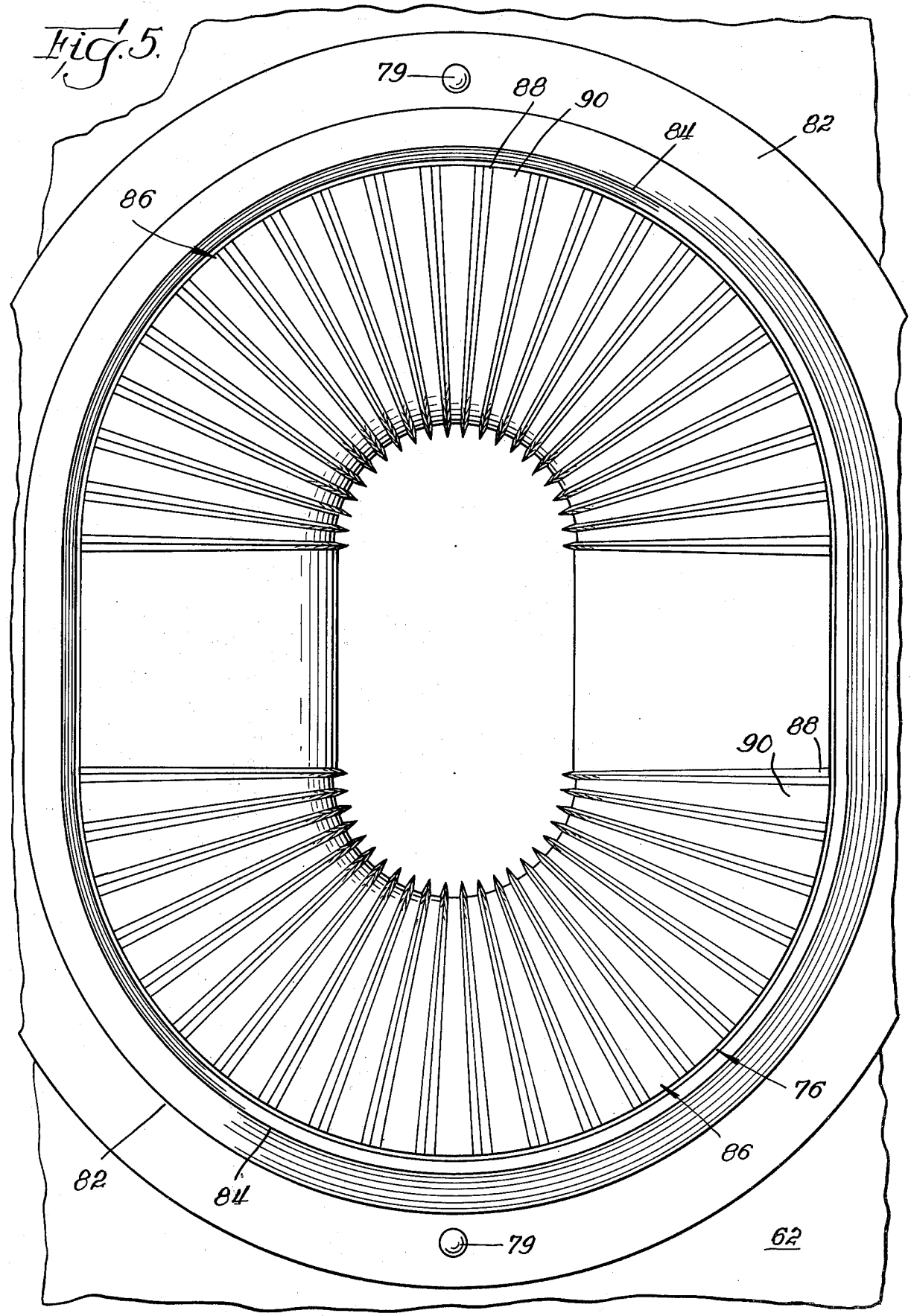
FIG. 5 is a detailed view of the female or concave die member of FIG. 4.

Referring now particularly to FIGS. 2 and 3, there is shown a seamless filter cup according to the invention having a dish-shaped bottom portion 10 and a fluted side portion 12 flaring outwardly from the bottom portion and formed from a single unitary sheet of filter paper. The bottom portion has parallel side edges 14 and arcuate end edges 16. The portions of the sides 14 flaring outwardly from the arcuate edges 16 are fluted as shown at 18. At the bottom of the dish-shaped bottom 10 is a center line 20 which is shorter in length than the side edges 14 and is parallel thereto. The portions 22 and 24 of the bottom portion 10 extending from the center line 20 to the side edges 14, as well as the portions of the sides 12 flaring outwardly from the side edges 14, are not fluted but are planar. The portions of the bottom portion 10 radiating from the ends of the center line 20 to the arcuate end edges 16 are fluted by flutes 26. Flutes 26 differ from the flutes 18 in that they are not ironed in flutes whereas, the flutes 18 are, but are the result of the stretching of the bottom portion in the manufacture of the cups, as will be more particularly described. It will be seen therefore that the bottom portion has two trapezoidal side portions 22 and 24 attached to each other at the center line 20 along the short edge of the trapezoid and are attached at the long edge of the trapezoid to side panels 28 and 30 of the side portion 12. It will be seen also, that the filter cup has mirror image symmetry about its longitudinal, transverse, and perpendicular axes. The longitudinal axis, with reference to FIG. 2, is the one coinciding with the center line 20. The transverse axis, also with reference to FIG. 2, is the one which is normal to the center line 20, and passes through the mid-point thereof, and the perpendicular axis is the axis which passes through the mid-point of the center line 20 and is normal or perpendicular to both the longitudinal and transverse axes.

If a plane were drawn through the parallel side portions 14 of bottom portion 10, the side portion 12 which comprises the planar side portions 28 and 30 and the fluted arcuate end portions 32 and 34 flare outwardly from the bottom portion at a substantial angle to that plane. Advantageously, this angle is between about 40° and about 60° and is determined by how permanently the flutes 18 are ironed in in the process of the manufacture, as will be described.

The remaining figures show apparatus for making the filter cups as shown in FIGS. 2 and 3. FIG. 1 shows the general machine for assembling a web of a plurality of sheets of filter paper, steaming the same, and cutting and forming filter cups therefrom. This apparatus comprises means 36 for mounting rolls 38 of filter paper and feeding them to a roll head 40 where they are consolidated into a single web. Between the roll holding means 36 and the consolidating roll 40 is a separator 42 for separating the individual sheets of the web to provide a uniform spacing between the same. Between the separator 42 and the consolidating roll 40 is a steam nozzle 44 mounted to spray moist steam into the separated sheets before they are consolidated into a single web. The consolidated web 46 is fed by consolidating roll 40 through a plurality of take up rolls 48 and 50 and guide rolls 52 and 54 into the die head 56 mounted on and operated by the ram press 58 operated by a power driven wheel 60.

The ram press 58 intermittently cuts and forms the filter paper cups from the web and the take up rolls 48 and 50 are arranged to compensate for the intermittent operation and to take up and feed slack paper web 46 to the die head 56 in a manner already well known in the art.

If desired, a second steam nozzle 44a may be provided on the opposite side of the machine as shown in FIG. 1a.

Referring now more particularly to FIG. 4, there is seen a detailed view of the die head 56. In the figure, parts in the lower portion are broken away to show the arrangement and construction of the dies and cutting elements and, in the top portion, dotted lines are used to show the movable or male die in the open position and solid lines to show it in the closed position.

The die head 56 comprises a fixed bolster 62 affixed to the ram press 68 by tie rods 64 and 66. Inner and outer nuts 68 and 70 are provided for setting the bolster 62 in the desired position and making such adjustments in the position as may be necessary or desirable.

Movably mounted on the tie rods 64 and 66 is a movable bolster 72 which is adapted to be moved back and forth on the tie rods 64 and 66 by piston rods 74 actuated to and fro in the ram press 58 in a manner already known in the art. The piston rods 74 may be multiplied as desirable to keep the movable bolster 72 parallel with the fixed bolster 62.

Mounted on the fixed boltser 62 is female die 66 having an annular portion 78 and a tubular or cylindrical portion 80 extending from the inner edge of the annular portion 78. The female die 76 is sweated into an aperture 83 in the fixed bolster 62 or otherwise fastened thereto with the annular portion 78 abutting the inner face of the fixed bolster 62. Advantageously, the cylindrical portion 80 has a shoulder 85 at its juncture with the annular portion 78 adapted to seat in a recess in the aperture 83 adapted to absorb the major thrust against the female die 76 or at least to absorb the thrust at the juncture of the annular portion of the tubular portion so as to minimize the stress at this juncture.

Also affixed to the fixed bolster 62 by means of bolts 80 or other suitable fastening means is an annular knife 82 adjacent the periphery of the female die 76. The annular knife 82 has a knife edge 84 shaped and located to cut the web of filter paper into discs of the desired size and shape.

The arrangement and construction of the female die 76 and the knife 82 may be more clearly seen in FIG. 5. It will be seen from this figure that the die 76 has arcuate ends and parallel sides and that the central aperture of the annulus and, by the same token, the cylindrical or tubular portion 80, also has arcuate ends and parallel sides. As best seen in FIG. 4, the annular portion of the die is concave and slopes inwardly and outwardly from the tubular portion at a slight angle. This angle is for the purpose of making it easier to draw the cut filter discs into the tubular section as will be described hereinafter and may range from about 12°, the angle shown, to as much as about 30°, or to as little as about 6°.

The arcuate end portions 86 of the female die 76 are provided with lands 88 alternating with grooves 90 spaced apart to impart flutes or pleats into the arcuate ends of the filter discs. The lands and grooves 88 and 90 in the arcuate ends of the annular portion of the female die 76, in cooperation with complementary lands and grooves in the male die, as will be described, cooperate to initiate the formation of flutes which are completed in the tubular portion 80 as will be more particularly described.

The movable bolster 72 may be affixed to the piston rods 74, or push rods as they might just as properly be called, by bolts 92.

Affixed to the movable bolster 62 is the complementary male die 94 having its base portion flush with the movable bolster 72 and affixed thereto by bolts 98 or other suitable fastening means. In describing this figure, primed numbers will be used to indicate the open position of the male die and unprimed numbers the closed positon. Around the periphery of the male member 94 is an annular anvil 100 arranged to cooperate with the cutting edge 84 of knife 82 for cutting the web into the filter discs. The anvil 100 is fastened to the movable bolster 72 by bolts 102 or other suitable fastening means.

The forward face 104 of the male die 94 has a slope which complements the slope of the inner face of the female die 76. This forward face in the arcuate end portions also has lands 106 and grooves 108 which are complementary with the flute forming lands and grooves 88 and 90 of the female die.

The piston or push rods 74 cause the male die to move from the open or prime position shown in dotted lines to the closed position where its lands 106 are in the grooves 90 of the female die and the lands of the female die are in the grooves 108 of the male die and where the knife edge 84 of the knife 82 is in contact with the anvil 100. In this position the web 46 is cut to form a composite disc of desired size and shape. At this stage the side portions of the composite filter discs are held and gripped between the annular portions of the two dies. At the center or bottom portion of the filter discs stands the tubular portion 80 of the female die. At this point a ram head or pusher 110 is advanced from the ram press 58 through an opening 112 in the movable bolster in to the bottom portion of the filter discs and pushes the fiter discs into the tubular portion 80 of the female die. As it is pushed thereinto, the side portions of the composite filter discs are pulled out of the space between the two dies and into the tubular portion 80 of the female die. The tubular portion 80 of the female die has lands 115 which are a continuation of the lands 88 of the annular portion of the female die, and grooves 117 which are a continuation of the grooves 90 of the annular portion of the female die.

The pusher or ram head 110 is mounted on a rod 118 which is moved into and out of the die head 56 by the ram press 58 by means already well known in the art. In FIGS. 6 and 7 details of the ram head or pusher 110 are illustrated. It comprises a body section 120 and a nose or head section 122. The bottom portion 120 has flat side panels 124 and arcuate end portions 126. The arcuate end portions have lands 128 alternating with grooves 130 which are complementary with the lands and grooves 115 and 117 of the tubular portion 80 of the female die 76.

FIG. 9 is an enlarged fragmentary view showing the precise relationship between the lands and grooves 128 and 130 and the lands and grooves 115 and 117. It will be seen that the grooves 117 are wide at the bottom and taper up only slightly with the average distance between adjacent lands 115 being about twice the thickness of the composite web. The lands 128 and grooves 130 pushing on the bights formed on the inner surface of the composite filter disc cups forces the opposite bight into the grooves 117.

The body 120 of the plunger or ram head is tapered slightly at the leading end as shown at 132. This facilitates starting the composite filter disc into the tubular portion 80 of the female die 76 and then further tightly compresses it into the grooves 117 as explained above.

It will be observed that the ends of the lands 128 extend beyond the side panels 124 and that the bottom of the grooves 130 extends inwardly of the side panels 124. These distances correspond roughly to those shown in FIG. 9 so that the side portions of the pusher or ram head 118 are complementary with the formed composite filter disc.

Mounted on the leading edge 134 of the ram head or pusher 110 is the nose 122. The nose 122 is narrower than the pusher or ram head 110 and tapers to a flat leading edge 136. The leading edge 136 is parallel with the leading face of the pusher 110 and is shorter than the width of the side panels 124. The nose cone has a base plate 138 which is fastened to the leading face 134 of the pusher 110 by bolts 140 or other suitable means. If desired, the nose 122 can be an integral part of the ram head 110 with the pusher tapering gradually from the forward end thereof to the leading edge 136. In such case, it is sometimes desirable to have the lands and grooves 128 and 130 continue on into the nose 122 and to gradually diminish in depth until they reach and merge into the leading edge 136.

When the leading edge 136 of the nose 122 of the ram head or pusher 110 engages the composite web held in the dies 76 and 94, it places stress on the central portion of the composite web disc and, in cooperation with the drag imposed on the side portions of the composite web disc by the apposed die elements, causes a stretching of the bottom portion of the composite web disc into a dish shape. Further movement of the pusher 110 will then draw the side portions of the composite web disc out of the apposed die portions and into the tubular portion 80 as shown in FIG. 4. The pusher 110 is then withdrawn and the operation repeated, at which time there will be two composite filter disc cups in the tubular portion as shown. The pusher 110 is withdrawn and the operation repeated whereupon the first formed filter disc cup assembly is ejected from the tubular portion 80 as shown in the dotted line of FIG. 4.

The tubular portion 80 of the female die 76 is heated by the electrical heater shown at 142. Any other equivalent heating means of course could be substituted. Hence, in the passage of the composite filter cups through the tube 80, the cups are heated and dried while the flutes are tightly compacted into the grooves 117 of the tubular portion 80 and thus are effectively ironed into the paper. Hence, when the filter cups are ejected as shown in FIG. 4, they assume the position shown in the dotted lines or the shape shown in FIGS. 2 and 3 and show no tendency to flatten out.

Thus, in the operation of the device illustrated, a dish-shaped filter cup is made from a unitary sheet of filter paper by forming a composite web of sheets of filter paper, steaming the composite web with moist steam, cutting discs from the web, forming flutes into the side portions surrounding a bottom portion, folding the side portions to a position essentially normal to the bottom portion while maintaining the flutes therein, stretching the bottom portion and heating and drying the cut and formed discs while the side portions are thus folded and the bottom portions are thus stretched to set the filter cups in the desired fluted and dish-shaped conformation. This process advantageously is effected with filter paper composed essentially of cellulose fiber from chemically prepared wood pulp which is uncalendered and unsized, is creped about 6 percent to about 15 percent, has a moisture content between about 3 percent and about 6 percent, and has about 28 to 40 pound basis weight. Filter paper of this composition has porosity suitable for effective filtering and a strength coupled with a wet stretchability such that, in the process described, the composite cut and fluted discs can be drawn into the tubular portion of the female die with the desired stretching of the bottom portion without any weakening or rupture of the individual filter paper cups formed. At the same time, when this paper is used and flutes formed therein as described and ironed into shape as described, there is obtained a filter cup which is effective for the purpose intended and elegant in appearance and performance.

It is to be understood that the invention is not to be limited to the exact details of operation or structure shown and described, as obvious modifications and equivalents will be apparent to one skilled in the art.

I claim:

1. A seamless filter cup comprising a unitary sheet of filter paper having integral fluted side portions flaring outwardly from a dish-shaped bottom, in which the dish-shaped bottom has parallel side edges and arcuate end edges, and in which the dish-shaped bottom has substantially planar side portions which converge from said parallel side edges to a center line which is shorter than said parallel side edges and is parallel thereto, and having a mirror image symmetry about its longitudinal, transverse, and perpendicular axes.

2. The filter cup of claim 1, in which the side portions flaring outwardly from said arcuate ends are fluted.

3. The filter cup of claim 2, in which the portions of the sides flaring outwardly from said parallel side edges are entirely planar.

4. The filter cup of claim 3, in which said dish-shaped bottom has flutes radiating from the ends of said center line to said arcuate end edges.

5. The filter cup of claim 4, in which the portions of the dish-shaped bottom between the center line and the parallel sides thereof are not fluted.

6. The filter cup of claim 5, in which the filter paper is composed essentially of cellulose fiber from chemically prepared wood pulp which is uncalendered and unsized, is creped about 6 to about 15 percent, has a moisture content between about 3 and about 6 percent, and has about 28 to about 40 pound basis weight.

7. The filter cup of claim 1, in which the filter paper is composed essentially of cellulose fiber from chemically prepared wood pulp which is uncalendered, unsized, is creped about 6 to about 15 percent, has a moisture content between about 3 and about 6 percent, and has about 28 to about 40 pound basis weight.

* * * * *